No. 638,248. Patented Dec. 5, 1899.
F. IDINGER.
DEVICE FOR FACILITATING PLAYING CITHERNS.
(Application filed Jan. 30, 1899.)
(No Model.)
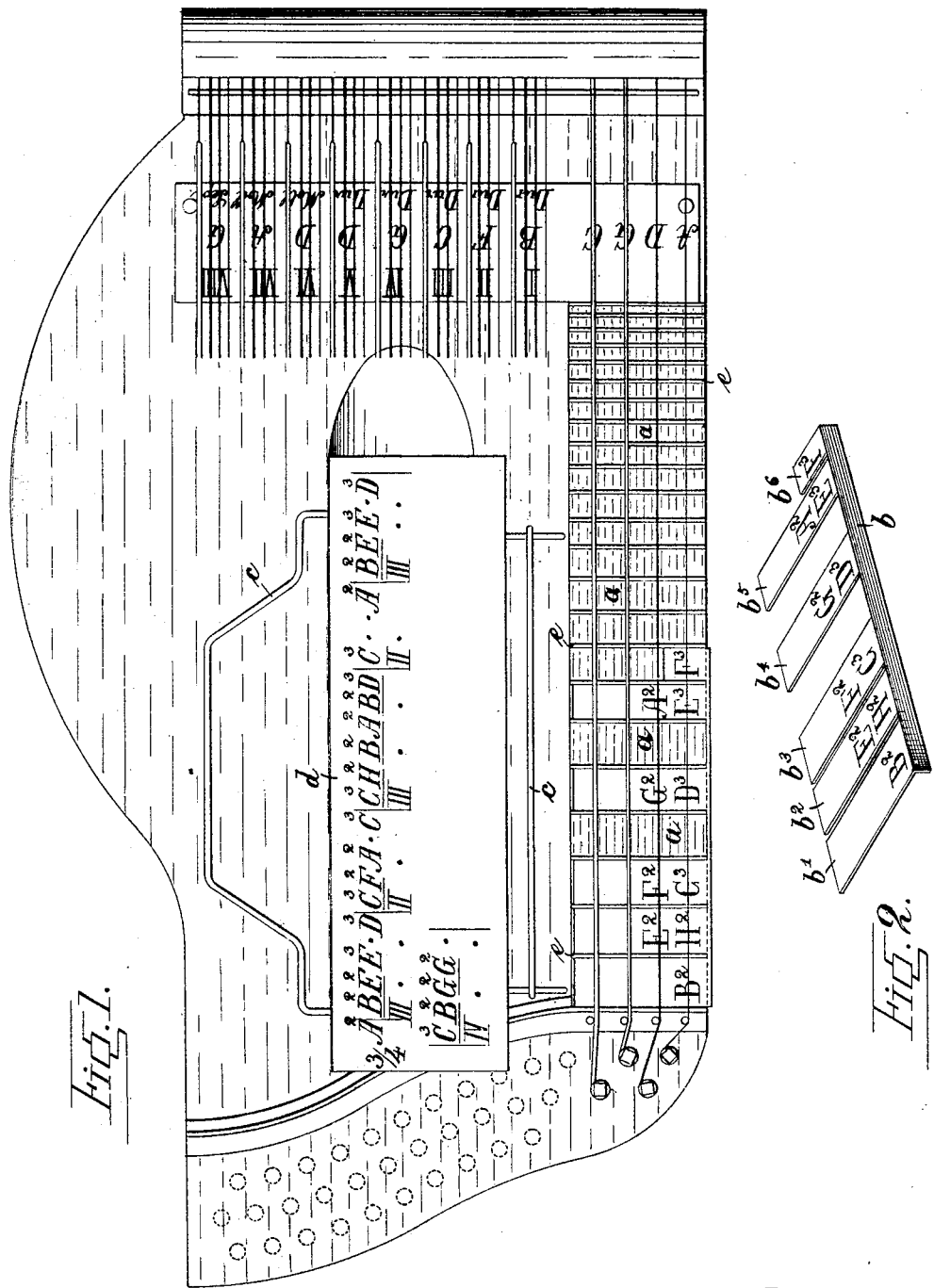

UNITED STATES PATENT OFFICE.

FRIEDRICH IDINGER, OF BERLIN, GERMANY.

DEVICE FOR FACILITATING PLAYING CITHERNS.

SPECIFICATION forming part of Letters Patent No. 638,248, dated December 5, 1899.

Application filed January 30, 1899. Serial No. 703,919. (No model.)

*To all whom it may concern:*

Be it known that I, FRIEDRICH IDINGER, a subject of the Emperor of Austria-Hungary, residing at Berlin, Empire of Germany, have invented a certain new and useful Improved Device for Facilitating Playing the Cithern, of which the following is a full, clear, and exact description.

The present invention consists of a device for facilitating playing the cithern, according to which interchangeable tune-strips are arranged on the finger-board underneath the strings and between the frets, which are provided on the said board to indicate the position of the various notes on the strings. The strips thus inserted are provided with letters indicating the notes, and said letters or letters and figures correspond to similar letters or letters and figures on the sheet of music from which the tune is read off. Usually the class of tunes which is best adapted for the present system consists of tunes which do not embrace all the notes on the strings. The tune-strips are white or of a bright color and may be of any thin material, and they thus show up well against the dark finger-board of the cithern. The chords which form the accompaniment are indicated in the music by Roman figures, and the corresponding strings on the cithern are also provided with corresponding Roman figures.

In order to render the present specification more easily intelligible, reference is had to the accompanying drawings, in which similar letters of reference denote similar parts throughout both views.

Figure 1 is a plan of the cithern and the improved means for facilitating playing the same, and Fig. 2 is a perspective view of the tune-strip.

Suitably mounted on the cithern is a frame $c$ to carry the piece of music $d$. $a$ indicates the finger-board, and $e$ the frets to indicate the notes on the strings for playing the melody. $b$ is the tune-strip, forming the main object of the present invention. The same consists of a strip $b$, having a series of tongues $b'$ $b^2$ $b^3$ $b^6$ to indicate the various notes belonging to the melody of the piece to be played. These tongues are bent around at right angles to the strip or back part $b$ and have each the corresponding note legibly inscribed thereon. The strip is slid under the strings on the finger-board, and the tongues lie between the frets indicating the notes, as shown at Fig. 1. The accord-strings for producing the proper accompaniment are arranged together in chords and indicated by the Roman figures I, II, III, IV, &c.

The music $d$ is provided with letters and index-numerals, which may refer to the octave in which the note is to be found.

The tune-strips are easily interchangeable, and the length of the various tongues may be made different by cutting off the end, inasmuch as there are no letters on the said end. By this means the various notes will be more readily recognized on the finger-board.

I claim as my invention—

1. Means for facilitating playing the cithern, consisting of a tune-strip having a series of tongues thereon with letters and figures representing the notes of the music-piece said tongues being adapted to lie on the finger-board under the strings and between the frets for producing the notes on the melody-strings substantially as described.

2. In a cithern the combination of a tune-strip, having a series of tongues of varying lengths inscriptions indicating the various notes on said tongues, said strip being located on the finger-board under the strings the tongues lying between the note-producing frets in the manner and for the purpose substantially as described.

In witness whereof I have hereunto set my hand in presence of two witnesses.

FRIEDRICH IDINGER.

Witnesses:
 ALFRED M. EISBURG,
 EMIL L. GOLDSCHMIDT.